United States Patent [19]

Ream

[11] Patent Number: 4,802,165

[45] Date of Patent: Jan. 31, 1989

[54] METHOD AND APPARATUS OF DEBUGGING COMPUTER PROGRAMS

[75] Inventor: Edward K. Ream, Madison, Wis.

[73] Assignee: Enteleki, Inc., Madison, Wis.

[21] Appl. No.: 916,747

[22] Filed: Oct. 8, 1986

[51] Int. Cl.⁴ .............................................. G06F 11/00
[52] U.S. Cl. .................................................... 371/19
[58] Field of Search ....................................... 371/19; 364/200 MS File, 300, 900 MS File, 580

[56] References Cited

U.S. PATENT DOCUMENTS

| | | | |
|---|---|---|---|
| 4,429,368 | 1/1984 | Kurii | 371/19 X |
| 4,482,953 | 11/1984 | Burke | 371/19 X |
| 4,636,940 | 1/1987 | Goodwin | 371/19 X |

Primary Examiner—Jerry Smith
Assistant Examiner—Robert W. Beausoliel
Attorney, Agent, or Firm—Robbins & Laramie

[57] ABSTRACT

A method and apparatus for debugging computer programs without recompiling them is disclosed. Marcos which may be called on to expand into operable code are inserted in the program at various locations. The programmer may select or deselect the macros from the command line and run the program repeatedly without recompiling the program for different tests. Marcos may also be deselected permanently and reversibly by recompiling with the marcos undefined so that they expand to empty code. Argument processing code and symbol table code are provided to control and track the debugging procedure.

14 Claims, 1 Drawing Sheet

METHOD AND APPARATUS OF DEBUGGING COMPUTER PROGRAMS

BACKGROUND OF THE INVENTION

1. Field of the Invention

The invention is directed to a method and apparatus useful for debugging computer programs and in particular to a method which allows selective tracking of the program by means of command line arguments without the necessity of recompiling the program.

2. Prior Art

When a new computer software product is conceived, there is a typical cycle or process that takes place in the course of bringing the product to the market. The programming cycle typically includes the conception of the idea; design of the software to implement the idea; coding of the program based on the system design; initial testing in the development environment; testing at the user site; and final release of the software to the market.

For example, after an idea occurs for a software product, system design takes place. This includes choosing the language, the compiler and the debugger to use for the product. Thereafter the programmer codes the program based upon the system design. Testing at the development side and in the user environment assures that the program will work as designed. If successful the product is released.

Normally the release of a software product depends on meeting development deadlines. If defects or errors (known as bugs) appear in the code, the product deadline will be missed. This is particularly likely if the bugs are complex, subtle or otherwise difficult to find. Such delays can cause a software product to fail in the marketplace. The present invention provides a debugging tool as a means for meeting deadlines as well as a meand for creating software that goes to market relatively free of errors.

There are many problems with existing debugging software tools. For example, programs are often debugged through the use of print statements which the programmer inserts throughout the program being debugged. When a problem occurs in a program, the programmer inserts the print statements in essentially a hit and miss way in order to try to locate the error. There are several serious problems with this approach.

When the program first fails, there are normally no print statements in the code that would indicate to the programmer where to look for the error. Thus the programmer must either use some separate method to find the general location of the error, or scatter print statements at random throughout the program in the hope that at least one print statement will provide some clues about where the problem lies. Of course, the more subtle the problem, the less likely the programmer is to choose the proper location for a print statement on the first try. Therefore, at the outset, at least, the programmer has no logical place to start the dubugging process.

In order to collect a significant amount of data from which to look for symptoms of the error, the programmer must insert a large number of print statements after the error has occurred. A great deal of time may be spent creating these statements.

Certain kinds of errors change their behavior depending upon the precise location and code. These errors destroy parts of the object code which strongly effects how the errors manifest themselves. For these kinds of errors, inserting print statements may change the nature of the error or even make it seem that the error has disappeared. When the print statements are removed, the error reappears. This kind of error can be extremely frustrating to a programmer trying to track down the ultimate cause of the bug.

The more print statements a programmer uses, the more output is generated. As frequently happens, so much output is generated that any significant information is buried in a mass of unimportant details. Thus, the programmer must always guess whether the benefits of inserting a print statement outweigh the disadvantages of creating unhelpful output.

Inserting print statements requires that all or part of the program be recompiled and relinked which is again a time consuming process. Likewise, when the programmer decides to remove a print statement, the program must be recompiled and relinked again. This also takes time. Once the print statement is removed it may not be reinserted without recompiling. Thus, each insertion or deletion of a print statement requires significant time and effort.

Because of the time required to insert and delete print statements, programmers are reluctant to experiment with output. The programmer is always asking whether the information obtained with a print statement is worth the time involved in inserting and removing the print statement.

It is difficult to keep track of what print statements were used in previous debugging runs. There is no obvious record of print statements that the programmer inserted or removed from one test run to another. This makes it difficult to reproduce and evaluate previous experiments.

When the programmer finds the cause of a bug, the print statements which were inserted must be removed or else they may hide or obscure operation of the program. The programmer must also repeat the entire cycle for each bug encountered.

In summary then, the use of print statements in debugging is extremely time consuming and frustrating for the programmer. It discourages spontaneous experimentation during a development cycle and such experiments if attempted are difficult to reconstruct. It may be impossible to recreate the symptoms of a problem when print statements are inserted and finally all work in finding a bug is discarded once the bug is found. No matter how many bugs a programmer finds, finding the next bug is just as difficult as finding the first. No tools are ever retained, reused or built upon in a logical systematic matter.

SUMMARY OF THE INVENTION

The present invention is a method of debugging a program using machine command line arguments without the necessity of recompiling the program. The method includes the steps of preparing a plurality of macros having corresponding expandable series of source code instructions for selectively tracing the program at selected program locations. The method further includes selectively activating the macros to perform corresponding tracing operations using command line arguments. The macros may be enabled or disabled without affecting the location of program code thereby avoiding the loss of a bug as in prior arrangements. A running count of macro calls and program line executions may be incorporated into the system.

DETAILED DESCRIPTION OF THE PREFERRED EMBODIMENT

Figure 1:
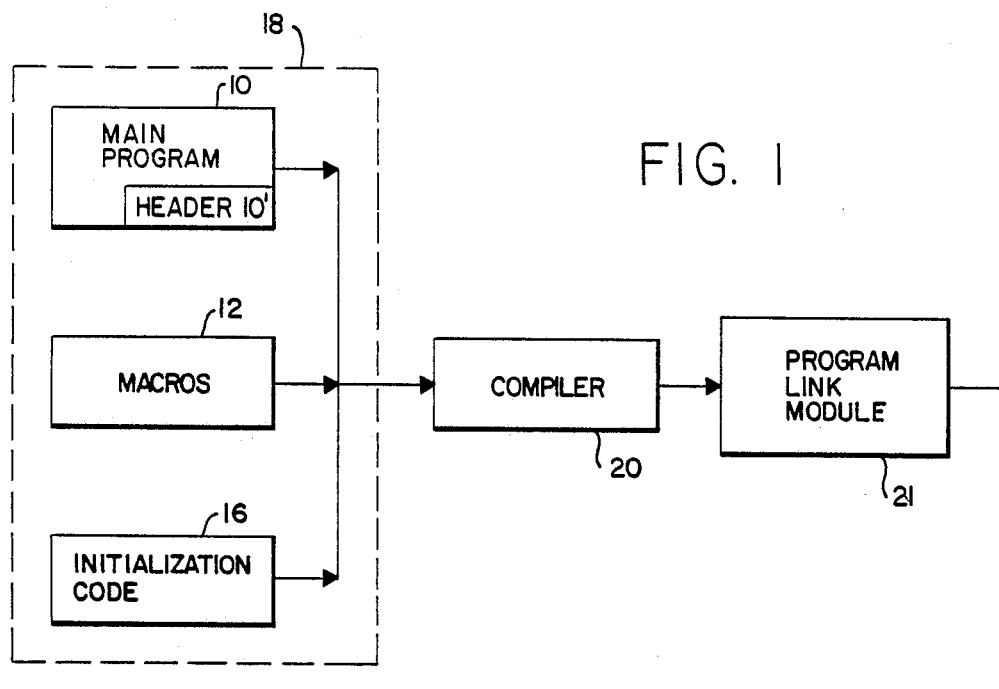
FIG. 1 is a schematic representation in block form illustrating the arrangement and architecture of the present invention.

The invention is directed to a method of debugging a program. It may be best implemented by a computer program which is compiled and linked with the main program to be debugged to create a composite program under test. The debugging program of the invention becomes part of the main program as it performs trace operations. Except for slowing down the main program at those locations where a trace is implemented, the debugging program does not significantly interfere with the main program. On the other hand, a trace may be disabled without rearranging code in memory thereby avoiding problems of coding errors due to the presence or absence of trace statements. When trace statements are selectively disabled, the program may be run at near normal speed to check its operation quickly.

Definition of Terms

Before proceeding further with the description of the invention, certain words shall be briefly described in order to assist in the understanding of the invention. These definitions should not be construed as all encompassing or limiting. The terms are generally known to those skilled in the art and may take on different meanings dependent upon how used. In general, however, the definitions accurately describe the terms for purposes of this discussion.

Bug: Any defect in a computer program.

Command Line: The instructions used to start a program. A command line may contain command line arguments used to modify the way in which the program will work.

Compile: To translate from source code to object code.

Compiler: A computer program which translates the source code of another program into object code.

Debug: To remove bugs from the source code of a computer program.

Dump: A display of the contents of the memory of a computer at a particular instant in time.

Function: A portion of a computer program which acts as an independent unit.

Linker: A program which gathers object code together to produce a computer program.

Macro: A definition, created by the computer programmer, of an abbreviation to be used throughout a computer program.

Macro Call: An appearance in the source code of an abbreviation defined by a macro. The macro is "expanded" by substituting into the source code the next full text of which the macro is an abbreviation.

Object Code: The form of a computer program created by a compiler. The form of a computer program which may be executed by the computer directly.

Output: The result of a computer program which may appear either on the terminal of the computer or on some other medium.

Print Statement: An instruction to the computer which causes output of some kind.

Routine: Synonym of function.

Source Code: The form of the computer program created by the computer programmer. The human-readable form of a computer program.

Symbol Table Code: A set of routines which store and return information about a particular class of computer objects.

Tool: Any computer program or routine which makes computer programming easier.

Trace: A record of the sequence or execution of a computer program.

Specific Discussion of the Invention

The invention may be described with respect to FIG. 1 as a method of debugging a main program 10 using a debugging program having three major portions as follows.

(I) A set of macros 12. Macros as noted above are definitions of abbreviations used throughout the program. When called, macros 12 are expanded to full source text prior to translating the source text into machine code. In other words, when a call for a macro 12 is encountered by the compiler the source code represented by the macro is incorporated into the program at that point. In general, in the present invention macros trace programs and count the occurrence of routines as hereinafter shown in detail. Source code for expanded macros is listed in the Appendix attached hereto.

The macros 12 allow the programmer to quickly specify with great precision actions in an abbreviated format. More importantly, the programmer may disable all the debugging macros in a file by simply setting one switch and recompiling the file as hereinafter described. The macros 12 are defined in a header file which is included in all of the files to be tested.

(II) Symbol table code 14 or a set of programs for handling (storing and returning) information about certain computer objects or symbols. The table allows the expanded macros to determine whether tracing has been enabled for a particular symbol. The symbol table code 14 also allows statistics to be kept for each symbol, whether or not tracing has been enabled for it. The Appendix lists the source code for these programs.

(III) Initialization code 16 or a computer code for enabling or disabling symbols from the command line. This computer code must appear in the beginning of the program under test. The code allows the programmer to insert and delete command line arguments which are executed by the programmer. The Appendix lists the source code for these programs.

Operation of the Program

Referring to FIG. 1, the invention operates as follows:

The main program 10, the set of macros 12 and the initialization code 16 may be combined in one file 18. The program 10 to be debugged is compiled or preprocessed on compiler 20 with the macros 12 of the debugging program to produce a program link module 21 (PLM). The main program includes a header file 10' which includes therein a definition of terms. The header file 10' places in a central and universal location the definition of a term or terms which will be used often in a program. Header files are house keeping devices. In the present invention the header file includes the definition of the symbol called BUG which is hereinafter described.

The PLM 21 is linked using a linker 22 with a symbol table code 14 (debugging module) to produce a runnable program 24 or program under test (PUT). Thereafter, command line arguments 32 are input in the PUT 24 to produce trace outputs 26 and statistics 28 as well as the normal output of the PUT 29.

Figure 2:
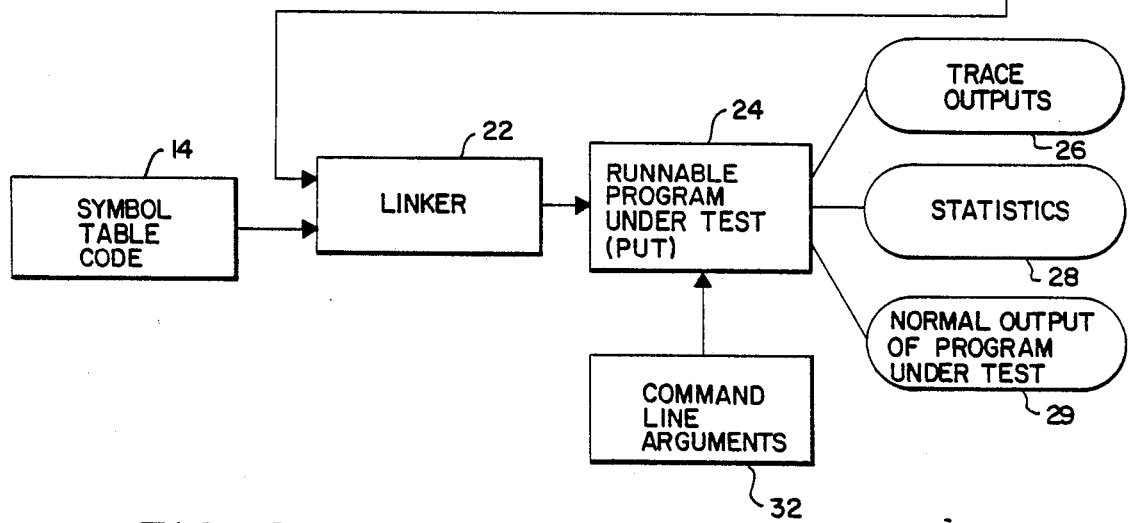
FIG. 2 is a schematic representation in block form of a detail of the present invention.
Figure 2:
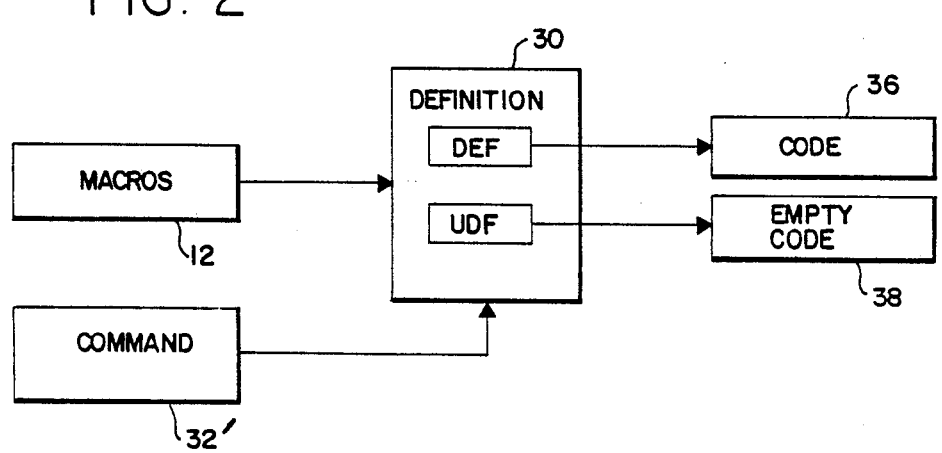

Macros 12 shown in FIG. 2 have a definition 30 consisting of two sub definitions: the first one is used when the symbol BUG is defined and a second is used when the symbol BUG is not defined. The said definition 30 is incorporated into the program under test 24. Command 32' may be used to choose between the two sub definitions of the main definition. When the symbol BUG is defined, the definition 30 of the macro 12 expands to code 36. When the symbol BUG is not defined, macro 12 expands to empty code 38. The runnable code 36 becomes part of the PUT 24 and is executed. Empty code 38 is essentially ignored.

After debugging, macros 12 may be permanently deselected or undefined and removed from the source code. This occurs because if a macro 12 is undefined and the program encounters a macro call which has no corresponding definition, no code is generated for the macro. In other words, the macro expands to empty code. After the macros are all deselected, the program under test 24 is recompiled to produce the program which may be marketed.

Table I below names and defines routines for handling the symbol table 14. These routines are called by the macro calls and expand source code when defined or expand to zero when undefined.

TABLE I

| Table Handling Routines | |
|---|---|
| bug_dump ( ): | Dump all statistics that have been gathered. |
| bug_init ( ): | Initialize the statistics gathering module. |
| bug_on (string): | Enable the tracing of string. |
| bug_off (string): | Disable the tracing of string. |
| bug_tick (string): | Increment the statistics associated with string. |
| bug_ton ( ): | Enable all tracing. |
| bug_troff ( ): | Disable all tracing. |
| bug_trace (string): | Return TRUE if tracing is enabled for string. |

Except for bug_unit (), bug_on (), and bug_off (), which are used by the main routine to turn tracing on and off, these routines should not be called directly because that would make it tedious to remove them when debugging is complete. Instead, the macros corresponding to these routines are used. In this way, removing all debugging statements is relatively simple. The definition of BUG is removed from the header file and all files are recompiled.

The following macro calls listed in Table II are available to call on the routines of Table I.

TABLE II

| Macro Calls | |
|---|---|
| BUG_DUMP ( ): | Dump all statistics that have been gathered. |
| BUG_INIT ( ): | Initialize the statistics gathering module. |
| BEGIN_TRACE (string): | Enable tracing of string. |
| END_TRACE (string): | Disable tracing of string. |
| TICK (string): | Increment the statistics associated with string. |
| TRON (string): | Enable all tracing if we had been tracing string before tracing was disabled. |
| TROFF: | Disable all tracing. |
| TRACE (string, statement list): | Execute statement list if tracing string. |

Disabling tracing using TROFF or bug_troff speeds the execution a great deal; a factor of 10-20 is not uncommon.

There is one special string understood by the debugging routines. The call of bug_on ("trace") is equivalent to bug_ton ("*") and the call to bug_off ("trace") is equivalent to bug_troff(). To put it another way, the macro call BEGIN_TRACE ("trace") is equivalent to TRON ("*"), and the macro call END_TRACE ("trace") is equivalent to TROFF. The reason for this special convention is to turn on and off all tracing from the command line using +trace or −trace.

The following is a procedure of the basic steps to follow when using the debugging program of the present invention.

PROCEDURE

Step 1: Prepare Source Files.

Use the TICK macro at the very beginning of every subroutine of function. This macro gathers statistics about how many times the routine is called and also will print a message if tracing is enabled.

Using the TRACE macro whenever it is desired to have a trace of the program. Likely candidates include:
(1) At the start of each function to show the arguments to a function.
(2) At the end of each function to show the results of the function.
(3) In the middle of program loops to show the progress of the program.
(4) Before and after complicated calculations to show how those calculations proceeded.

For example, suppose the programmer is writing a C language function called f. The programmer would typically add the following kinds of TICK and TRACE calls:

```
int f (a, b, c)
char *a;
int b,c;
{
  int i, r;
  TICK ("f");

TRACE ("f",printf(f(%s, %d, %d)\n", a,b,c));
    for (i=o; i<b; i++) {

TRACE("f loop", printf("f loop: *a is %c\n", *a));
    }

TRACE("f", printf("f returns %d\n", r));
    return r;
}
```

It may seem that using this debugging package is illogical; after all, many macro calls must be inserted in the code. In practice though, the additional time spend in creating these TICK and TRACE macros is negligible compared with the time saved debugging. Putting in TICK and TRACE macros becomes second nature and adds only a few percent to the time required to type in programs. The small amount of time spent typing in TICK and TRACE macros probably saves several minutes in debugging time in the long run. The payoff is using these macros systematically is enormous.

In order to have access to all the macros, the programmer must include the header file BUG.H in all files. One way to do this without changing all source files is to include BUG.H in the master header file 10'.

The symbol called BUG must be defined in every file in which the TICK and TRACE macros are used. If BUG is not defined, the TICK and TRACE macros generate absolutely no code.

Step 2: ADD Argument Processing Code to Program and Test.

The program must be able to translate command line arguments of the form:

+routine or

−routine into calls on the bug_on () and bug_off () routines. For example, if the program were called p and you invoked p as follows:

p+abc in out then the program would have to call bug on ("abc"); this process is not very difficult. Examples of how to process command line arguments are included with the debugging package.

Step 3: Run the Program with Appropriate Command Line Arguments from a Submit File.

For a variety of reasons the programmer will probably want to invoke the program from some kind of batch file (also known as a shell file or submit file). This saves the programmer from retyping long command lines and also serves as a permanent record of exactly what tests were run on the program. A record of previous runs may be prepared by leaving them in the batch file, but commenting them out so that only one version of the test is "active" in the batch file at any one time.

For example, suppose a program called p is usually called with two arguments as follows:

p in out

If the programmer wants to turn on the tracing for the routine called abc, the following command line argument may be typed:

p+abc in out

Wildcards can be used in the names of the routines to trace. For example, to turn on tracing of all routines starting with "abc", but not the routine called "abc1" the following may be written on the command line:

p+abc*−abc1 in out

The asterisk (*) matches 0 or more characters. A question mark matches exactly one character.

The debugging routines treat the string "trace" in a special way.

−trace turns off all tracing until enabled by a TRON macro call

Step 4: Eliminate Tracing Code as Needed.

When tracing is no longer desired for the routines in a particular file, the programmer undefines the symbol called BUG and recompiles the entire file. All the debugging code is thereby eliminated. There is no need to actually remove the TICK and TRACE macros from the files; in fact, it would be a mistake to do so because they may be needed again if further debugging becomes necessary.

Typically, recompiling with BUG undefined would be done only for when the debugged code is being prepared for release—compiling out the debugging macros makes it impossible to do further tracing. Of course, when further bugs are found, tracing can be done in one of two ways: (1) an archive copy of the program with tracing still in can be used; or (2) the appropriate sections of code can be recompiled with BUG turned on again.

Below is a brief summary of the debugging process:
I. Prepare Source Files
   A. Include header file BUG.H
   B. Include TICK and TRACE macros
   C. Add argument processing code
   D. Add Symbol Table Code (Debugging Routine)
II. Create program under test
   A. Compile all parts of the program
   B. Compile the debugging routines
   C. Link the debugging routines with the program
III. Run program under test
   A. Create batch file
   B. Enable appropriate traces
   C. Run program
   D. Examine the output created by the TICK and TRACE macros.
IV. Prepare program without tracing
   A. Recompile with definition of BUG deselected
   (NOTE: Step IV may be reversed to select BUG and combined with a recompile step so that further debugging may be accomplished if desired.)

The macros are inserted where appropriate in the main program. For example, TICK ("abc") will cause an entry to be created in the symbol table created by the symbol table code 14 each time routine abc is accessed. The TICK macro also counts the number of times it has been called with a particular string as to argument. TRACE ("abc") will trace the routine called abc each time it occurs. By using wild card definitions and minus statements portions of abc may be omitted from the TRACE statement. Also TRACE statement can be written so that a TRACE occurs only after a certain number of occurrences (TICKs). This is often used in a situation where the program runs properly for a long time and then all of a sudden a bug appears. Such an instruction allows the program to turn at practically full speed until it is supposed that the error is likely to occur after which TRACE statements are executed.

TRACE macros may be selectively disabled or deselected from the command line in order to simplify or reduce output. In other words only certain routines may be traced so that experiments may be performed. Also all traces may be disabled from the command line using the -trace option. Running the program with such an option in the command line causes the PUT to run at almost full speed. A variety of other arrangements may be attempted by those skilled in the art.

In the present invention the argument processing code allows enabling or disabling of TICKs and TRACEs from the command line directly. Thus, tracing with the present invention may be accomplished without recompiling the program each time the program is run with a new set of TRACE statements. Also, all TRACE and TICK statements may be permanently but reversibly deselected by means of changing the header file definition and then recompiling the program after it has been debugged.

The present invention allows selective use of TRACE and TICK statements without causing the program to move code to different memory locations each time a TICK or TRACE is selectively enabled or disabled. Thus problems associated with the destruction of object code as occurs in the prior art is obviated.

-A1-

APPENDIX

```
 1: /*
 2:
 3:        Tracing and statistics gathering macros.
 4:
 5:        Copyright (C) 1985, 1986 by Enteleki, Inc.
 6:        All Rights Reserved
 7:
 8:        source: bug.h
 9:
10: */
11:
12: /*
13:        There are two versions for each routine,
14:        one with BUG on (defined) and the other with BUG off.
15: */
16:
17: #ifdef BUG
18:
19: /* Enable/disable all tracing. */
20: #define TROFF            bug_toff();
21: #define TRON(s)          bug_ton(s);
22:
23: /* Bump stats for symbol s. */
24: #define TICK(s)          bug_tick(s)
25:
26: /* Turn on tracing for symbol s. */
27: #define BEGIN_TRACE(s)   bug_on(s)
28: #define END_TRACE(s)     bug_off(s)
29:
30: /* Execute a statement if tracing for symbol s is on. */
31: #define TRACE(s, statement)    if (bug_trace(s)) (statement;)
32: #define TRACEP(s, statement)   if (bug_ptrace(s)) (statement;)
33:
34: #else
35:
36: #define TROFF
37: #define TRON
38: #define TICK(s)
39: #define BEGIN_TRACE(s)
40: #define END_TRACE(s)
```

```
41:    #define TRACE(s, statement)
42:    #define TRACEP(s, statement)
43:
44:    #endif
45:
 2:        Debugging and statistics gathering and printing routines.
 3:
 4:        Copyright (C) 1985, 1986 by Enteleki, Inc.  All Rights Reserved.
 5:        Under the copyright laws
 6:
 7:
 8:        Source:  bug.c
 9:
10:
11:
12:
13:
14:
15:
16:        INDEX TO ROUTINES DEFINED IN THIS FILE:
17:
18:        The following externally visible symbol table routines are defined
19:        in this file:
20:
21:        LINE    ROUTINE          DESCRIPTION.
22:        177     bug_dump();      dump the symbol table.
23:        342     bug_init();      initialize this module
24:        436     bug_off(s);      turn tracing off for string s. Wild cards legal.
25:        460     bug_on(s);       turn tracing on for string s. Wild cards legal.
26:        565     bug_tick(s);     bump stats for string s. Wild cards NOT legal.
27:        607     bug_ton(s);      enable tracing if tracing for s is enabled.
28:        623     bug_toff();      disable all tracing.
29:        636     bug_trace(s);    return TRUE if tracing s. Wild cards legal.
30:        671     bug_ptrace(s);   same as bug_trace but printf("s:");
31:
32:        The following routines are not visible outside this file:
33:
34:        LINE    ROUTINE          DESCRIPTION
35:        129     bug_check(s1, s2);  Check to see if string s1 is valid.
36:        273     bug_find(s,flag);   return pointer to node or NULL.
37:                                    Allocate node if not found and flag == TRUE.
38:        391     bug_new();          Allocate new node.
39:
40:        710     has_wild(s);        Return true if string s contains wild card.
41:
42:        The following strings cause actions inside this module when
43:        entered from the command line:
44:
45:                -trace      Disable all tracing.
46:                +trace      Enable all tracing (default).
47:
48:        !!!! WARNING !!!
49:        These routines call strcmp_() and streq_() which MUST NOT use
50:        any macro defined in BUG.H file.
51:    */
52:    #define BUG_STATS 1
53:    /* comment out -----
```

```
54:  #define BUG_DEBUG 1
55:  ----- end comment out */
56:
57:  /*
58:        Define various constants.
59:  */
60:  #define TRUE 1
61:  #define FALSE 0
62:  #define NULL 0L
63:
64:  /*
65:        Define statistics variables.
66:
67:        We do NOT call storage allocation to get node storage,
68:        so as not to disturb memory.
69:  */
70:  static struct stat {
71:        struct stat * next;    /* alphabetical list.           */
72:        char * name;           /* pointer to checkpoint name.  */
73:        long   n_ticks;        /* # of calls to bug_tick().    */
74:        long   n_traces;       /* # of calls to bug_trace().   */
75:        long   n_disable;      /* # of prints to skip or 0.    */
76:        int    trace;          /* trace flag.                  */
77:  };
78:
79:  #define MAX_STAT 1000
80:  static struct stat nodes [MAX_STAT];   /* Static node table. */
81:  static int cur_stat;
82:
83:  #define MAX_INDEX 128
84:  static struct stat * index [MAX_INDEX]; /* Alphabetical lists. */
85:  static struct stat * wildcard;  /* Head of wildcard list.     */
86:
87:  static int troff;       /* Turn off all tracing if TRUE.       */
88:  static char * check_s;  /* Pointer to routine doing the check. */
89:  static long disable;    /* Disable count set by bug_set().     */
90:  static long g_disable;  /* Global disable counter for all var. */
91:
92:  /*
93:        Internal tracing variables.
94:  */
95:  #ifdef BUG_STATS
96:
97:  static int t_init;
98:  static int t_trace;
99:  static int t_tick;
100: static int t_on;
101: static int t_off;
102: static int t_set;
103: static int t_find;
104: static int t_check;
```

```
105:    static int t_wild;
106:    static int t_new;
107:    static int t_match;
108:    static int t_cmp;
109:    static int t_eq;
110:
111:    #endif
112:
113:    /*
114:            Check the string arguments to the tracing function.
115:            This routine should help catch missing or erroneous arguments.
116:
117:            The check_s global variable points to a string containing the
118:            name of the macro responsible for invoking the check.
119:
120:            Return its argument, except that it parses a leading
121:            disable number and returns the a pointer past it.
122:
123:            Also return the number (or 0) in the global disable.
124:
125:            Example:    bug_check("125abc") returns a pointer to "abc" and sets
126:                        disable to 125.
127:    */
128:    static
129:    bug_check(s)
130:    register char *s;
131:    {
132:            register int c, i;
133:
134:    #ifdef BUG_STATS
135:            t_check++;
136:    #endif
137:
138:    #ifdef BUG_DEBUG
139:            printf("bug_check(%s)\n", s);
140:    #endif
141:
142:            /* Check for null string. */
143:            if (!*s) {
144:                    printf("bug_check: %s: null string @ %lx\n", check_s, s);
145:                    exit();
146:            }
147:
148:
149:            for (i = 0; i < 25; i++) {
150:                    c = *s++;
151:                    if (c == '\0') {
152:                            return ;
153:                    }
154:
155:                    /* Allow only identifiers and wild cards. */
156:                    if (   (c < 'a' || c > 'z') &&
157:                           (c < 'A' || c > 'Z') &&
158:                           (c < '0' || c > '9') &&
159:                           (c != '_') &&
160:                           (c != '*') &&
```

```
161:                              (c != '?')
162:                     ) {
163:
164:                             printf("bug_check: %s: bad character: %c in %s @ %lx\n",
165:                                     check_s, c, s, s);
166:                             exit();
167:
168:                     }
169:             }
170:             printf("bug_check: %s: run on argument: %s @ %lx\n", check_s, s, s);
171:             exit();
172:     }
173:
174:     /*
175:             Print all statistics.
176:     */
177:     bug_dump()
178:     {
179:             register struct stat *p;
180:             register int i;
181:             long tot_ticks, tot_traces;
182:             long percent, totp_ticks, totp_traces;
183:
184:             printf("\n\nDump of debugging tables and statistics:\n\n");
185:
186:             /* Calculate grand total times. */
187:             tot_ticks = 0;
188:             tot_traces = 0;
189:             for (i = 0; i < MAX_INDEX; i++) {
190:                     for (p = index[i]; p; p = p -> next) {
191:                             tot_ticks  += p -> n_ticks;
192:                             tot_traces += p -> n_traces;
193:                     }
194:             }
195:
196:             /* Print the table in alphabetical order. */
197:             printf("\n%14s %10s %4s %10s %5s tracing\n\n",
198:                     "breakpoints", "ticks", " ", "traces", " ");
199:
200:             totp_ticks = 0;
201:             totp_traces = 0;
202:             for (i = 0; i < MAX_INDEX; i++) {
203:                     for (p = index[i]; p; p = p -> next) {
204:                             if (p -> n_ticks || p -> n_traces || p -> trace) {
205:                                     /* Print breakpoint name. */
206:                                     printf("%14s ", p -> name);
207:
208:                                     /* Print tick statistics. */
209:                                     if (tot_ticks == 0) {
210:                                             percent = 0;
211:                                     }
212:                                     else {
213:                                             percent = ((p -> n_ticks * 100) / tot_ticks);
214:                                             totp_ticks += percent;
```

```
215:                              )
216:                              printf("%8ld = %3ld%s ",
217:                                      p -> n_ticks, percent, "%");
218:
219:                              /* Print trace statistics. */
220:                              if (tot_traces == 0) {
221:                                      percent = 0;
222:                              }
223:                              else {
224:                                      percent = ((p -> n_traces * 100) / tot_traces);
225:                                      totp_traces += percent;
226:                              }
227:                              printf("%8ld = %3ld%s ",
228:                                      p -> n_traces, percent, "%");
229:
230:                              /* Indicate whether tracing was enabled. */
231:                              printf("%8s\n", (p -> trace) ? "ON" : "OFF");
232:                      }
233:              }
234:      }
235:
236:      /* Print the totals. */
237:      printf("\n%14s %8ld %s %3ld%s %8ld %s %3ld%s\n\n",
238:              "TOTALS:",
239:              tot_ticks, " ", totp_ticks, "%",
240:              tot_traces, " ", totp_traces, "%");
241:
242:      /* Print wildcard table. */
243:      printf("%14s  tracing\n\n", "Wildcards");
244:      for (p = wildcard; p; p = p -> next) {
245:              printf("%14s ", p -> name);
246:              printf("%7s\n", (p -> trace) ? "ON" : "OFF");
247:      }
248:
249: #ifdef BUG_STATS
250:      printf("\nInternal Variables\n\n");
251:      printf("t_init  = %d\n", t_init);
252:      printf("t_trace = %d\n", t_trace);
253:      printf("t_tick  = %d\n", t_tick);
254:      printf("t_on    = %d\n", t_on);
255:      printf("t_off   = %d\n", t_off);
256:      printf("t_set   = %d\n", t_set);
257:      printf("t_find  = %d\n", t_find);
258:      printf("t_check = %d\n", t_check);
259:      printf("t_wild  = %d\n", t_wild);
260:      printf("t_new   = %d\n", t_new);
261:      printf("t_match = %d\n", t_match);
262:      printf("t_cmp   = %d\n", t_cmp);
263:      printf("t_eq    = %d\n", t_eq);
264: #endif
265:
266: }
267:
268: /*
269:      Return a pointer to the node for s, or NULL.
270:      Allocate a new node if flag == TRUE.
```

```
271:    */
272:    static struct stat *
273:    bug_find(s, flag)
274:    register char *s;
275:    register int flag;
276:    {
277:            register int c, i;
278:            register struct stat *p, *q, *node;
279:
280:            struct stat * bug_new();
281:
282:    #ifdef BUG_STATS
283:            t_find++;
284:    #endif
285:
286:    #ifdef BUG_DEBUG
287:            printf("bug_find(%s, %d)\n", s, flag);
288:    #endif
289:
290:            /* Search the proper index table. */
291:            c = (*s & 0x7f);
292:            p = index[c];
293:
294:            if (p != NULL) {
295:                    i = strcmp_(s, p -> name);
296:                    if (i == 0) {
297:                            return p;
298:                    }
299:            }
300:            if (p == NULL || i < 0) {
301:                    bug_check(s);
302:                    if (flag == TRUE) {
303:                            node = bug_new(s);
304:                            index [c]    = node;
305:                            node -> next = p;
306:                            node -> n_disable = disable;
307:                            return node;
308:                    }
309:                    else {
310:                            return NULL;
311:                    }
312:            }
313:
314:            /* Search the list for the node. */
315:            for (q = p, p = p -> next; p; q = p, p = p -> next) {
316:                    i = strcmp_(s, p -> name);
317:                    if (i == 0) {
318:                            return p;
319:                    }
320:                    else if (i < 0) {
321:                            break;
322:                    }
323:            }
324:
325:            /* Not found. */
326:            bug_check(s);
```

```
327:        if (flag == TRUE) {
328:                node = bug_new(s);
329:                q -> next    = node;
330:                node -> next = p;
331:                node -> n_disable = disable;
332:                return node;
333:        }
334:        else {
335:                return NULL;
336:        }
337: }
338:
339: /*
340:         Initialize the statistics routines.
341: */
342: bug_init()
343: {
344:         register int i;
345:
346: #ifdef BUG_STATS
347:         t_init  = 1;
348:         t_trace = 0;
349:         t_tick  = 0;
350:         t_on    = 0;
351:         t_off   = 0;
352:         t_set   = 0;
353:         t_find  = 0;
354:         t_check = 0;
355:         t_wild  = 0;
356:         t_new   = 0;
357:         t_match = 0;
358:         t_cmp   = 0;
359:         t_eq    = 0;
360: #endif
361:
362: #ifdef BUG_DEBUG
363:         printf("bug_init()\n");
364: #endif
365:
366:         /* Nobody is doing a check yet. */
367:         check_s = NULL;
368:
369:         /* We are not skipping all bug routines. */
370:         troff = FALSE;
371:
372:         /* Initialize node allocation. */
373:         cur_stat = 0;
374:
375:         /* Initialize the index tables. */
376:         for (i = 0; i < MAX_INDEX; i++) {
377:                 index [i] = NULL;
378:         }
379:
380:         /* Initialize the wildcard list. */
381:         wildcard = NULL;
382: }
```

```
383:
384:    /*
385:            Allocate a new node from the static node table.
386:
387:            If a match is found from the wildcard list, use that value for tracing.
388:            Otherwise, set the tracing field to zero.
389:    */
390:    static struct stat *
391:    bug_new(s)
392:    register char *s;
393:    {
394:            register struct stat * node, *p;
395:
396:    #ifdef BUG_STATS
397:            t_new++;
398:    #endif
399:
400:    #ifdef BUG_DEBUG
401:            printf("bug_new(%s)\n", s);
402:    #endif
403:
404:            /* Not found. Point node at a new node. */
405:            if (cur_stat >= MAX_STAT) {
406:                    printf("bug_tick: trace table overflow\n");
407:                    exit();
408:            }
409:
410:            /* Create the new node. */
411:            node = nodes + cur_stat;
412:            cur_stat++;
413:            node -> name = s;
414:            node -> n_ticks = 0;
415:            node -> n_disable = disable;
416:
417:            /*
418:                    Search the wildcard list for a node which matches s.
419:                    If found.  Set trace field.
420:            */
421:            for (p = wildcard; p; p = p -> next) {
422:                    if (is_match(p -> name, s)) {
423:                            node -> trace = p -> trace;
424:                            return node;
425:                    }
426:            }
427:
428:            /* No match. */
429:            node -> trace = 0;
430:            return node;
431:    }
432:
433:    /*
434:            Turn tracing off for one variable or a class of variables.
435:    */
436:    bug_off(s)
437:    char *s;
```

```
438: {
439:
440: #ifdef BUG_STATS
441:         t_off++;
442: #endif
443:
444: #ifdef BUG_DEBUG
445:         printf("bug_off(%s)\n", s);
446: #endif
447:
448:         if (streq_(s, "trace")) {
449:                 troff = TRUE;
450:         }
451:         else {
452:                 check_s = "TRACE_OFF";
453:                 bug_set(s, 0);
454:         }
455: }
456:
457: /*
458:         Turn tracing on for one variable or a class of variables.
459: */
460: bug_on(s)
461: char *s;
462: {
463:
464: #ifdef BUG_STATS
465:         t_on++;
466: #endif
467:
468: #ifdef BUG_DEBUG
469:         printf("bug_on(%s)\n", s);
470: #endif
471:
472:         if (streq_(s, "trace")) {
473:                 troff = FALSE;
474:         }
475:         else {
476:                 check_s = "TRACE_ON";
477:                 bug_set(s, 1);
478:         }
479: }
480:
481: static
482: bug_set(s, flag)
483: register char *s;
484: int flag;
485: {
486:         register struct stat * p;
487:         register int c, i;
488:
489: #ifdef BUG_STATS
490:         t_set++;
491: #endif
492:
493: #ifdef BUG_DEBUG
```

```
494:            printf("bug_set(%s, %d)\n", s, flag);
495:    #endif
496:
497:            /* Skip over the initial disable count. */
498:            disable = 0;
499:            while (*s >= '0' && *s <= '9') {
500:                    c = *s++;
501:                    disable = disable * 10 + c - '0';
502:            }
503:            if (*s == '\0') {
504:                    /* Global suppress. */
505:                    g_disable = disable;
506:                    disable = 0;
507:                    return;
508:            }
509:
510:            bug_check(s);
511:            if (!has_wild(s)) {
512:
513:                    /* No wild card.  Just set one flag. */
514:                    p = bug_find(s, TRUE);
515:                    p -> trace = flag;
516:                    if (flag == 0 && p -> n_disable != 0) {
517:                            /* Ignore leading count. */
518:                            p -> n_disable = 0;
519:                            printf("-disable count ignored\n");
520:                    }
521:                    return;
522:            }
523:
524:            /* Set tracing flag for all matching routines. */
525:            if (*s == '*' || *s == '?') {
526:
527:                    /* Search ALL lists. */
528:                    for (i = 0; i < MAX_INDEX; i++) {
529:                            for (p = index [i]; p; p = p -> next) {
530:                                    if (is_match(p -> name, s)) {
531:                                            p -> trace = flag;
532:                                    }
533:                            }
534:                    }
535:            }
536:            else {
537:
538:                    /* Search only one list. */
539:                    c = (*s & 0x7f);
540:                    for (p = index [c]; p; p = p -> next) {
541:                            if (is_match(p -> name, s)) {
542:                                    p -> trace = flag;
543:                            }
544:                    }
545:            }
546:
547:            /*
548:                    Add new element at the head of the wildcard list.
549:                    This will supercede any previous conflicting entries.
```

```
550:        */
551:        p        = bug_new(s);
552:        p -> next = wildcard;
553:        wildcard = p;
554:        p -> trace = flag;
555:        if (flag == 0 && p -> n_disable != 0) {
556:            /* Ignore leading count. */
557:            p -> n_disable = 0;
558:            printf("-disable count ignored\n");
559:        }
560: }
561:
562: /*
563:        Update one statistic.
564: */
565: bug_tick(s)
566: register char * s;
567: {
568:        register struct stat * p;
569:
570: #ifdef BUG_STATS
571:        t_tick++;
572: #endif
573:
574: #ifdef BUG_DEBUG
575:        printf("bug_tick(%s)\n", s);
576: #endif
577:
578:        if (troff) {
579:            return;
580:        }
581:
582:        /* Find the proper node.  Allocate one if needed. */
583:        check_s = "TICK";
584:        p = bug_find(s, TRUE);
585:
586:        /* Bump the statistic. This is ONLY done here. */
587:        p -> n_ticks++;
588:
589:        /* Print a tracing message. */
590:        if (g_disable > 0) {
591:            g_disable--;
592:            if (p -> n_disable > 0) {
593:                p -> n_disable--;
594:            }
595:        }
596:        else if (p -> n_disable > 0) {
597:            p -> n_disable--;
598:        }
599:        else if (p -> trace) {
600:            printf("TICK: %s\n", s);
601:        }
602: }
603:
604: /*
605:        Enable or disable all tracing.
```

```
606:    */
607:    bug_ton(s)
608:    char *s;
609:    {
610:            register struct stat *p;
611:
612:    #ifdef BUG_DEBUG
613:            printf("bug_ton(%s)\n", s);
614:    #endif
615:
616:            check_s = "TRON";
617:            p = bug_find(s, FALSE);
618:            if (p != NULL) {
619:                    troff = FALSE;
620:            }
621:    }
622:
623:    bug_toff()
624:    {
625:    #ifdef BUG_DEBUG
626:            printf("bug_toff()\n");
627:    #endif
628:
629:            troff = TRUE;
630:    }
631:
632:    /*
633:            Return TRUE if tracing s.
634:    */
635:    int
636:    bug_trace(s)
637:    register char *s;
638:    {
639:            register struct stat *p;
640:
641:    #ifdef BUG_STATS
642:            t_trace++;
643:    #endif
644:
645:    #ifdef BUG_DEBUG
646:            printf("bug_trace(%s)\n", s);
647:    #endif
648:
649:            if (!troff) {
650:                    return FALSE;
651:            }
652:            check_s = "TRACE";
653:            p = bug_find(s, TRUE);
654:
655:            /* Bump the trace statistic. */
656:            p -> n_traces++;
657:
658:            if (g_disable > 0 || p -> n_disable > 0) {
659:                    /* Only TICK macro changes these disable counts. */
660:                    return FALSE;
661:            }
```

```
662:        else {
663:                return p -> trace;
664:        }
665: }
666:
667: /*
668:        Same as TRACE but with automatic printing of the routine's name.
669: */
670: int
671: bug_ptrace(s)
672: register char *s;
673: {
674:        register struct stat *p;
675:
676: #ifdef BUG_STATS
677:        t_trace++;
678: #endif
679:
680: #ifdef BUG_DEBUG
681:        printf("bug_ptrace(%s)\n", s);
682: #endif
683:
684:        if (troff) {
685:                return FALSE;
686:        }
687:        check_s = "TRACE1";
688:        p = bug_find(s, TRUE);
689:
690:        /* Bump the trace statistic. */
691:        p -> n_traces++;
692:
693:        if (g_disable > 0 || p -> n_disable > 0) {
694:                /* Only the TICK macro changes these counts. */
695:                return FALSE;
696:        }
697:        else if (p -> trace) {
698:                printf("%s: ", s);
699:                return TRUE;
700:        }
701:        else {
702:                return FALSE;
703:        }
704: }
705:
706: /*
707:        Return TRUE if s1 contains a wildcard character.
708: */
709: static int
710: has_wild(s)
711: register char *s;
712: {
713:        register int c;
714:
715: #ifdef BUG_STATS
716:        t_wild++;
717: #endif
```

```
718:
719: #ifdef BUG_DEBUG
720:         printf("has_wild(%s)\n", s);
721: #endif
722:
723:         while (c = *s++) {
724:                 if (c == '*' || c == '?') {
725:                         return TRUE;
726:                 }
727:         }
728:         return FALSE;
729: }
730:
731: /*
732:         Return TRUE if s1 matches s2 with wildcards possible in s1.
733: */
734: static int
735: is_match(s1, s2)
736: register char *s1, *s2;
737: {
738:         register int c;
739:
740: #ifdef BUG_STATS
741:         t_match++;
742: #endif
743:
744: #ifdef BUG_DEBUG
745:         printf("is_match(%s, %s)\n", s1, s2);
746: #endif
747:
748:         while (c = *s1++) {
749:                 if (c == '*') {
750:                         /* Matches zero or more characters. */
751:                         return TRUE;
752:                 }
753:                 else if (c == '?') {
754:                         /* Matches exactly one character. */
755:                         if (*s2 == '\0') {
756:                                 return FALSE;
757:                         }
758:                         else {
759:                                 s2++;
760:                         }
761:                 }
762:                 else if (c != *s2++) {
763:                         return FALSE;
764:                 }
765:         }
766:         return !*s2;
767: }
768:
769: /*
770:         Compare s1 and s2.
771:         Return <0 ==0 >0
```

```
772:    */
773:    static int
774:    strcmp_(s1,s2)
775:    register char *s1, *s2;
776:    {
777:            register char c;
778:
779:    #ifdef BUG_STATS
780:            t_cmp++;
781:    #endif
782:
783:    #ifdef BUG_DEBUG
784:            printf("strcmp_(%s, %s)\n", s1, s2);
785:    #endif
786:
787:            while (*s1 == *s2) {
788:                    if (*s1 == '\0') {
789:                            return 0;
790:                    }
791:                    else {
792:                            s1++;
793:                            s2++;
794:                    }
795:            }
796:            return ((int) *s1) - ((int) *s2);
797:    }
798:
799:    /*
800:            Return TRUE if s1 == s2
801:    */
802:    static int
803:    streq_(s1, s2)
804:    register char *s1, *s2;
805:    {
806:
807:    #ifdef BUG_STATS
808:            t_eq++;
809:    #endif
810:
811:    #ifdef BUG_DEBUG
812:            printf("streq_(%s, %s)\n", s1, s2);
813:    #endif
814:
815:            while(*s1) {
816:                    if (*s1++ != *s2++) {
817:                            return FALSE;
818:                    }
819:            }
820:            return !*s2;
821:    }
822:
```

What is claimed is:

1. A method of debugging a computer program comprising the steps of selectively tracing the program at run time by means of command line arguments without recompiling, including the steps of: defining a plurality of selectively expandable macros for a plurality of corresponding diagnostic tracing functions, said macros including expansion enabling instructions and tracing instructions, associating a corresponding name string with each macro, selecting by command line arguments particular macros to be enabled and disabled and particular functions to be traced, turning selected macros on and off using its corresponding associated name string at run time and running the program.

2. A method of debugging a program comprising the steps of selectively tracing the program at run time by means of command line arguments without recompiling, including the steps of:

defining each of a plurality of macros to perform selected debugging functions, providing a sub definition in the form of a name string corresponding to each defined macro, and locating the macros in a corresponding file of the program;

providing trace instructions and locating the instructions in a corresponding macro;

defining a series of argument processing instructions and locating them in a corresponding instruction file;

compiling the program with the macros and linking the argument processing instructions therewith to produce a runnable program under test and selectively enabling or disabling the code produced by the compiler from the macros using the name string for each corresponding macro to trace selected portions of program under test by means of selective use of command line arguments.

3. The method of claim 2 wherein the macros occupy unchanging memory locations and effect only execution speed of the program.

4. The method of claim 2 wherein the macros do not effect other memory locations in the program by virtue of their being selectively enabled or disabled.

5. The method of claim 2 further comprising the steps of selectively expanding the macros at compile time in accordance with the sub definitions by selectively defining the macros in a master definition in a header file, the presence or absence of the master definition selectively enables or disables the expansion of all the macros accordingly and compiling the program.

6. A method of debugging a program at run time without recompiling the program comprising the steps of:

defining macros by name and function;
providing at least two sub definitions of each defined macro corresponding to when a symbol corresponding to the macro name is defined or not;
incorporating call macro instructions in the program to be debugged;
providing instructions for enabling and disabling the macros by means of command line arguments;
selectively enabling and disabling the macros from the command line arguments by using the macro name, and running the program.

7. The method of claim 6 comprising expanding the macros in accordance with whether a symbol is defined or undefined to produce respective operation code and empty code and thereafter compiling the program.

8. The method of claim 6 further including providing select and deselect instructions in the form of a definition for each macro in a header file and providing instructions to permanently but reversible deselect all the macros from the program to be debugged so that when called the macros expand to empty code and thereby have no effect on the execution of the program to be debugged.

9. The method of claim 6 wherein the macros include instructions to trace selected routines.

10. The method of claim 6 wherein the macros include instructions to count the execution of selected routines.

11. A computer program for debugging at run time a program to be tested comprising:

macro means for defining in abbreviated form corresponding names for a plurality of sets of corresponding instructions;

name string means associated with each set of instructions;

debugging routine means corresponding to each set of instructions, each debugging routine means performing a selected debugging function of a corresponding macro;

selecting means for selecting and deselecting the debugging routine means by defining and undefining the corresponding macros by means of the name string associated with the corresponding set of instructions;

processing means for processing arguments in the form of the name strings from a command line in the program;

compiler means for compiling the macros, the selecting means and the processing means for producing compiled output; and means for linking the debugging routine means and the compiled output.

12. The apparatus of claim 11 further including counter means for counting the execution of routines.

13. In a process for debugging a computer program from the command line at run time using a debugging program comprising the steps of preparing source files for the debugging program including inserting macros for tracing and counting routines, argument processing code, a symbol table code and a master definition for enabling the macros;

naming the macros by means of a name string;

creating a program under test by compiling the computer program with the argument processing code and macros to form a program link module and linking the program link module with the symbol table;

selectively enabling and disabling macros by name from the command file; and running the program under test with selected macros enabled and disabled and examining the results of the macros for errors and debugging the program where appropriate.

14. The method of claim 13 further comprising selectively enabling and disabling such named macros by name prior to recompiling the recompiling the program to enable and disable all such named macros throughout the program.

* * * * *